(12) United States Patent
Zhou et al.

(10) Patent No.: US 9,115,309 B2
(45) Date of Patent: Aug. 25, 2015

(54) ZINC MANGANESE SILICATE CONTAINING METAL PARTICLES LUMINESCENT MATERIALS AND PREPARATION METHODS THEREOF

(75) Inventors: Mingjie Zhou, Shenzhen (CN); Wenbo Ma, Shenzhen (CN); Chaopu Shi, Shenzhen (CN)

(73) Assignee: OCEAN'S KING LIGHTING SCIENCE & TECHNOLOGY CO., LTD., Shenzhen, Guangdong (CN)

( * ) Notice: Subject to any disclaimer, the term of this patent is extended or adjusted under 35 U.S.C. 154(b) by 365 days.

(21) Appl. No.: 13/703,342

(22) PCT Filed: Jun. 30, 2010

(86) PCT No.: PCT/CN2010/074775
§ 371 (c)(1),
(2), (4) Date: Dec. 10, 2012

(87) PCT Pub. No.: WO2012/000179
PCT Pub. Date: Jan. 5, 2012

(65) Prior Publication Data
US 2013/0126784 A1    May 23, 2013

(51) Int. Cl.
*C09K 11/59* (2006.01)
*C09K 11/87* (2006.01)
*C01B 33/20* (2006.01)

(52) U.S. Cl.
CPC .............. *C09K 11/59* (2013.01); *C01B 33/20* (2013.01); *C09K 11/595* (2013.01); *C09K 11/87* (2013.01); *C09K 11/876* (2013.01)

(58) Field of Classification Search
CPC .... C09K 11/595; C09K 11/584; C09K 11/08; C09K 11/574; C09K 11/59; C09K 11/87; C09K 11/876; C01P 2004/64; C01P 2004/62; C01B 33/20; B82Y 20/00

USPC ....... 252/301.6 R, 301.4 F, 301.4 R, 301.6 F; 977/834

See application file for complete search history.

(56) References Cited

U.S. PATENT DOCUMENTS

2004/0075386 A1* 4/2004 Hoshino et al. ............... 313/582

FOREIGN PATENT DOCUMENTS

| CN | 1594496 A | 3/2005 |
|---|---|---|
| CN | 101007945 A | 8/2007 |

(Continued)

OTHER PUBLICATIONS

Lun Ma and Wei Chen. Luminescence enhancement and quenching in ZnS: Mn by Au nanoparticles. Journal of Applied Physics. 107, 123513(2010).

(Continued)

*Primary Examiner* — Matthew E Hoban
*Assistant Examiner* — Lynne Edmondson
(74) *Attorney, Agent, or Firm* — Shimokaji & Associates, P.C.

(57) ABSTRACT

Zinc manganese silicate containing metal particles luminescent materials and preparation methods thereof are provided. The said luminescent materials are a blend of metal M nanoparticles and $Zn_{2-x}SiO_4:Mn_x$, wherein M is one of Ag, Au and Pt, $0.001 \leq x \leq 0.1$, $0.00001 \leq y \leq 0.01$, y is the molar ratio of M to $Zn_{2-x}SiO_4:Mn_x$. The said methods include the following steps: step 1, preparing silica aerogel containing metal particles; step 2, weighing source compound of zinc, source compound of manganese and the silica aerogel in step 1 at stoichiometric ratio and mixing them to form mixture; step 3, sintering the mixture in step 2, then cooling and grinding to form the said luminescent materials with higher luminescent intensity. The said methods have simple steps, easy operation, low sintering temperature and low cost.

8 Claims, 2 Drawing Sheets

(56) References Cited

FOREIGN PATENT DOCUMENTS

| | | |
|---|---|---|
| CN | 102134482 A | 7/2011 |
| JP | S57174832 A | 10/1982 |
| JP | S59-184281 A | 10/1984 |
| JP | 2005-302549 | 10/2005 |
| KR | 20070035812 A | 4/2007 |
| WO | 0029503 A2 | 5/2000 |
| WO | WO 0029503 A1 * | 5/2000 |
| WO | 0073400 A1 | 12/2000 |
| WO | WO 0073400 A1 * | 12/2000 |

OTHER PUBLICATIONS

Yu-Lin Min, et al. Au@Y2O3:Eu3+ rare earth oxide hollow sub-microspheres with encapsulated gold nanoparticles and their optical properties. Solid state science. 11(2009) 96-101.

* cited by examiner

ZINC MANGANESE SILICATE CONTAINING METAL PARTICLES LUMINESCENT MATERIALS AND PREPARATION METHODS THEREOF

FIELD OF THE INVENTION

The present invention relates to luminescent materials and preparation methods thereof. More particularly, the invention relates to green luminescent materials of zinc silicate doped with manganese ions containing metal particles and preparation methods thereof.

BACKGROUND OF THE INVENTION

In recent years, field emission devices have attracted much attention due to the advantages, such as low operating voltage, low power consumption, no deflection coil, no X-ray radiation, radiation resistance and magnetic interference resistance, etc. By exciting the luminescent material using field emission cathode ray, field emission light source of high luminance and good color rendering properties can be obtained, which can be applied to professional lighting, display, instructions, general lighting and other fields.

Preparation of fluorescent powders of great performance is a key to prepare field emission devices of excellent performance. At present, fluorescent materials provided in field emission devices are commonly luminescent materials of traditional cathode-ray tube and projection television kinescope, such as sulfide series, oxide series and oxysulfide series fluorescent powders. For example, Xiong Liangming et al., CN Patent. No. 200410025310.5 discloses a method for preparing green powders of zinc silicate doped with manganese ions by means of low-temperature solid phase reaction. Mesoporous silica, zinc salt and manganese salt in the +2 valence state are provided and used as raw materials, weigh accurately mesoporous silica and disperse in alcoholic solutions of zinc salt and manganese salt in the +2 valence state, after drying, under the protection of neutral gas, calcine at 750° C. to 950° C. to prepare green powders of zinc silicate doped with manganese ions of high efficiency by means of solid phase reaction. The green powders of zinc silicate doped with manganese ions prepared by such method are good in color purity, but low in luminous efficiency.

SUMMARY OF THE INVENTION

The technical problem of the present invention to be solved is to provide green luminescent materials of zinc silicate doped with manganese ions containing metal particles with good stability and high luminous intensity, and to provide preparation methods thereof.

The technical solution to solve the technical problem of the present invention is: to provide green luminescent materials of zinc silicate doped with manganese ions containing metal particles, said green luminescent materials are the blend of metal M nanoparticles and $Zn_{2-x}SiO_4:Mn_x$, wherein M is one of Ag, Au and Pt, x is in a range of $0.001 \geq x \geq 0.1$, y is in a range of $0.00001 \leq y \leq 0.01$, y is the molar ratio of M to $Zn_{2-x}SiO_4:Mn_x$.

The luminescent materials of the present invention, said metal M is one of Ag, Au and Pt, x is in a range of $0.001 \leq x \leq 0.08$, y is in a range of $0.00001 \leq y \leq 0.005$.

And, preparation methods of green luminescent materials of zinc silicate doped with manganese ions containing metal particles, comprising:

step 1: preparing silica aerogel containing metal particles;

step 2: selecting source compound of zinc, source compound of manganese and silica aerogel containing metal particles obtained in step 1 according to stoichiometric ratios, mixing to form mixture, said stoichiometric ratios of the source compounds are according to the molar ratio of corresponding elements in the blend of metal M nanoparticles and $Zn_{2-x}SiO_4:Mn_x$, where M is one of Ag, Au and Pt, x is in a range of $0.001 \leq x \leq 0.1$, y is in a range of $0.00001 \leq y \leq 0.01$, y is the molar ratio of M to $Zn_{2-x}SiO_4:Mn_x$;

step 3: sintering the mixture obtained in step 2 at constant temperature, cooling and grinding to obtain said green luminescent materials of zinc silicate doped with manganese ions containing metal particles.

In the present invention, said preparation method of silica aerogel containing metal particles in said step 1 comprises: firstly, dissolving weighed silica aerogel in ethanol solution containing corresponding compound of metal, stirring at 50° C. to 75° C. for 0.5 to 3 hours, then sonicating for 10 min, drying at 60° C. to 150° C., grinding the dried raw materials well, calcining at 600° C. to 1300° C. for 0.5 to 3 hours. Said metal particle is one of Ag, Au and Pt; said corresponding compound of Ag is silver nitrate, said corresponding compound of Au is $HAuCl_4$, said corresponding compound of Pt is $HPtCl_4$.

In said step 2, said source compound of zinc is one of zinc oxide, zinc nitrate, zinc acetate and zinc oxalate; said source compound of manganese is one of manganese oxide, manganese acetate, manganese carbonate and manganese oxalate.

In said step 3, the sintering temperature is in the range of 1000 to 1400° C., the time of sintering is in the range of 1 to 10 hours, the sintering is carried out at constant temperature in the air.

Compared to the prior art, due to the addition of metal element to green luminescent materials of zinc silicate doped with manganese ions containing metal particles of the present invention, under the excitation of cathode ray, surface plasma resonance effect occurs on the interface among metal and $Zn_2SiO_4:Mn$, which improves effectively the luminescence property of $Zn_2SiO_4:Mn$ and increases the luminance of the luminescent materials of the present invention. In addition, the preparation method of the present invention is simple, easy to operate, low-cost, of which the calcination temperature is low.

BRIEF DESCRIPTION OF THE DRAWINGS

Further description of the present invention will be illustrated, which combined with embodiments in the drawings.

DETAILED DESCRIPTION OF ILLUSTRATED EMBODIMENTS

Figure 1:
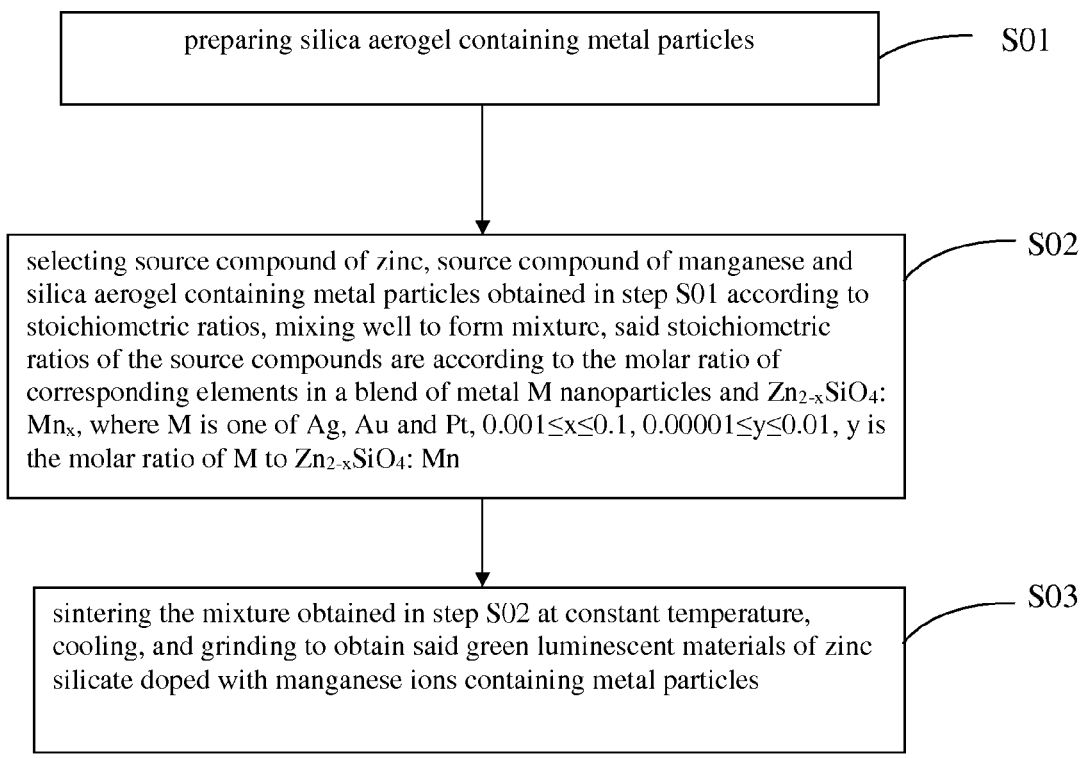
FIG. 1 is a flow chart of the method for preparing green luminescent materials of zinc silicate doped with manganese ions containing metal particles of the present invention.

Further description of the present invention will be illustrated, which combined with embodiments in the drawings, in order to make the purpose, the technical solution and the advantages clearer. While the present invention has been described with reference to particular embodiments, it will be understood that the embodiments are illustrative and that the invention scope is not so limited.

The present invention provides green luminescent materials of zinc silicate doped with manganese ions containing metal particles, said green luminescent materials are the blend of metal M nanoparticles and $Zn_{2-x}SiO_4:Mn_x$, wherein M is one of Ag, Au and Pt, x is in a range of $0.001 \leq x \leq 0.1$, y is in a range of $0.00001 \leq y \leq 0.01$, y is the molar ratio of M to $Zn_{2-x}SiO_4:Mn_x$.

The luminescent materials of the present invention, said metal M is one of noble metals Ag, Au and Pt; x is in a range of $0.001 \leq x \leq 0.08$, y is in a range of $0.00001 \leq y \leq 0.005$.

Referring to FIG. 1, FIG. 1 shows flow chart of the preparation methods of the present invention. The preparation methods comprise:

Step S01: preparing silica aerogel containing metal particles, herein, the aperture of said silica aerogel is in the range of 20 to 100 nm, the porosity is in the range of 92% to 98%;

Step S02: selecting source compound of zinc, source compound of manganese and silica aerogel containing metal particles obtained in step S01 according to stoichiometric ratios, mixing well to form mixture, said stoichiometric ratios of the source compounds are according to the molar ratio of corresponding elements in the blend of metal M nanoparticles and $Zn_{2-x}SiO_4:Mn_x$, where M is one of Ag, Au and Pt, x is in a range of $0.001 \leq x \leq 0.1$, y is in a range of $0.00001 \leq y \leq 0.01$, y is the molar ratio of M to $Zn_{2-x}SiO_4:Mn_x$;

Step S03: sintering the mixture obtained in step S02 at constant temperature in the air, cooling to room temperature, and grinding to obtain said green luminescent materials of zinc silicate doped with manganese ions containing metal particles.

In the present invention, said preparation method of silica aerogel containing metal particles in said step S01 comprises: firstly, dissolving weighed silica aerogel in ethanol solution containing corresponding compound of metal, stirring at 50° C. to 75° C. for 0.5 to 3 hours, then sonicating for 10 min, drying at 60° C. to 150° C., grinding the dried raw materials well, calcining at 600° C. to 1300° C. for 0.5 to 3 hours. Said metal particle is one of Ag, Au and Pt; said corresponding compound of Ag is silver nitrate, said corresponding compound of Au is $HAuCl_4$, said corresponding compound of Pt is $HPtCl_4$.

In said step S02, said source compound of zinc is one of zinc oxide, zinc nitrate, zinc acetate and zinc oxalate; said source compound of manganese is one of manganese oxide, manganese acetate, manganese carbonate and manganese oxalate.

In said step S03, the sintering temperature is in the range of 1000 to 1400° C., the time of sintering is in the range of 1 to 10 hours.

Compared to the prior art, due to the addition of metal element to green luminescent materials of zinc silicate doped with manganese ions containing metal particles of the present invention, under the excitation of cathode ray, surface plasma resonance effect occurs on the interface among metal and $Zn_2SiO_4:Mn$, which improves effectively the luminescence property of $Zn_2SiO_4:Mn$ and increases the luminance of the luminescent materials of the present invention. In addition, the preparation method of the present invention is simple, easy to operate, low-cost, of which the calcination temperature is low.

Special embodiments are disclosed as follows to demonstrate preparation methods of green luminescent materials of zinc silicate doped with manganese ions containing metal particles and the performances of it.

Example 1

Preparation of Green Light-Emitting Material of a Blend of Metal Au Nanoparticles and $Zn_{1.999}SiO_4:Mn_{0.001}$ Weighing 0.3 g of silica aerogel, dissolving in 10 mL of ethanol solution containing $0.5 \times 10^{-5}$ mol/L chloroauric acid ($HAuCl_4$), stirring at 50° C. for 3 h, then sonicating for 10 min. Drying at 60° C., and grinding the dried samples well, pre-calcining at 600° C. for 4 h. Then, weighing 1.5144 g of zinc nitrate, 0.0005 g of manganese carbonate and 0.2404 g of silica aerogel containing gold (Au), mixing well. Calcining in the air at 1000° C. and keep the temperature constant for 10 h, then cooling down to room temperature, new green light-emitting material, which is the blend of metal Au nanoparticles and $Zn_{1.999}SiO_4:Mn_{0.001}$, is obtained. The molar ratio of Au to $Zn_{1.999}SiO_4:Mn_{0.001}$ is 0.00001. The luminescent material with good luminescence property and color purity can emit green light under the excitation of cathode ray.

Example 2

Preparation of Green Light-Emitting Material of a Blend of Metal Ag Nanoparticles and $Zn_{1.94}SiO_4:Mn_{0.06}$ Weighing 1.0 g of silica aerogel, dissolving in 30 mL of ethanol solution containing $5.43 \times 10^{-4}$ mol/L $AgNO_3$, stirring at 70° C. for 0.5 h, then sonicating for 10 min. Drying at 150° C., and grinding the dried samples well, pre-calcining at 1000° C. for 0.5 h. Then, weighing 1.1904 g of zinc oxalate ($ZnC_2O_4$), 0.0343 g of manganese oxalate ($MnC_2O_4$) and 0.2404 g of silica aerogel containing Ag, mixing well. Calcining in the air at 1200° C. and keep the temperature constant for 6 h, then cooling down to room temperature, new green light-emitting material, which is the blend of metal Ag nanoparticles and $Zn_{1.999}SiO_4:Mn_{0.001}$, is obtained. The molar ratio of Ag to $Zn_{1.999}SiO_4:Mn_{0.001}$ is 0.001. The luminescent material with good luminescence property and color purity can emit green light under the excitation of cathode ray.

Example 3

Preparation of Green Light-Emitting Material of a Blend of Metal Pt Nanoparticles and $Zn_{1.92}SiO_4:Mn_{0.08}$ Weighing 1.0 g of silica aerogel, dissolving in 30 mL of ethanol solution containing $2.72 \times 10^{-3}$ mol/L $HPtCl_4$, stirring at 70° C. for 0.5 h, then sonicating for 10 min. Drying at 150° C., and grinding the dried samples well, pre-calcining at 1000° C. for 0.5 h. Then, weighing 1.4093 g of zinc acetate ($Zn(CH_3CO_2)_2$), 0.0554 g of manganese acetate ($Mn(CH_3CO_2)_2$) and 0.2404 g of silica aerogel containing Pt, mixing well. Calcining in the air at 1300° C. and keep the temperature constant for 4 h, then cooling down to room temperature, new green light-emitting material, which is the blend of metal Pt nanoparticles and $Zn_{1.92}SiO_4:Mn_{0.08}$, is obtained. The molar ratio of Pt to $Zn_{1.92}SiO_4:Mn_{0.08}$ is 0.005. The luminescent material with good luminescence property and color purity can emit green light under the excitation of cathode ray.

Example 4

Preparation of Green Light-Emitting Material of a Blend of Metal Ag Nanoparticle and $Zn_{1.992}SiO_4:Mn_{0.008}$ Weighing 0.4 g of silica aerogel, dissolving in 15 mL of ethanol solution containing $3.13\times10^{-4}$ mol/L $AgNO_3$, stirring at 60° C. for 1.5 h, then sonicating for 10 min. Drying at 70° C., and grinding the dried samples well, pre-calcining at 800° C. for 2 h. Then, weighing 0.6486 g of zinc oxide (ZnO), 0.0037 g of manganese carbonate ($MnCO_3$) and 0.2404 g of calcined silica aerogel containing Ag, mixing well. Calcining in the air at 1250° C. and keep the temperature constant for 4 h, then cooling down to room temperature, new green light-emitting material, which is the blend of metal Ag nanoparticle and $Zn_{1.992}SiO_4:Mn_{0.008}$, is obtained. The molar ratio of Ag to $Zn_{1.992}SiO_4:Mn_{0.008}$ is 0.0007. The luminescent material with good luminescence property and color purity can emit green light under the excitation of cathode ray.

Figure 2:
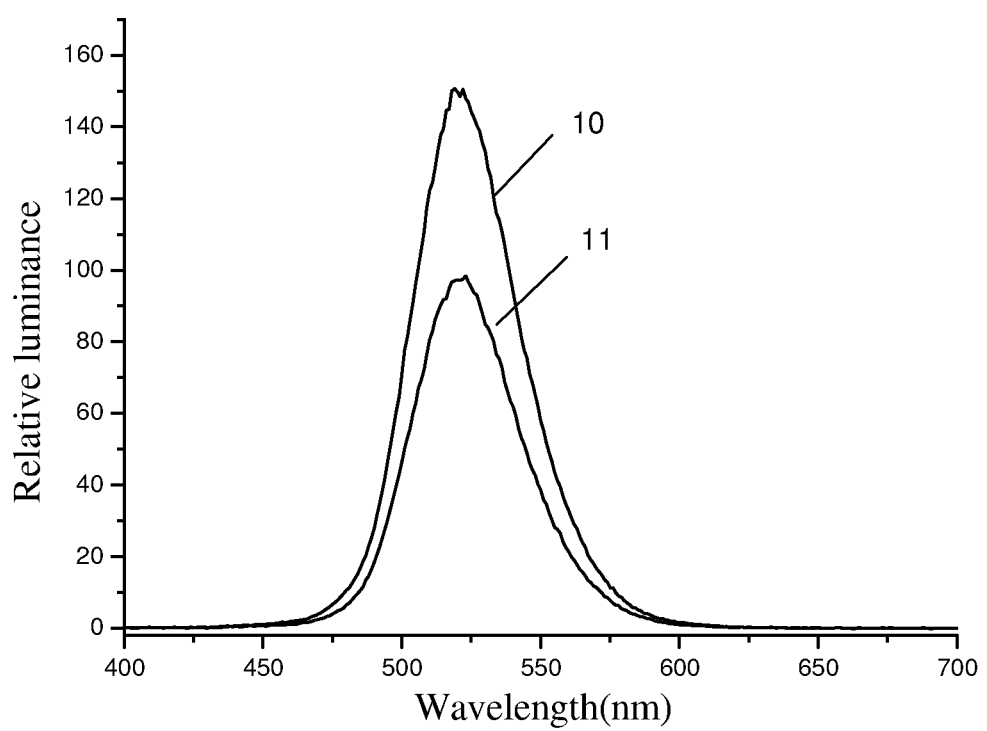
FIG. 2 is a cathodoluminescence spectrum of zinc manganese silicate containing metal particles luminescent material in Example 4 of the present invention with respect to luminescent material $Zn_{1.992}SiO_4:Mn_{0.008}$. Herein, the cathodoluminescence spectrums are produced by a Shimadzu spectrofluorometer RF-5301PC, and the test conditions are: cathode ray excitation, 5 KV acceleration voltage.

FIG. 2 is a cathodoluminescence spectrum of luminescent material of silicate in Example 4 with respect to luminescent material $Zn_{1.992}SiO_4: Mn_{0.008}$. Herein, curve 10 indicates luminescent material of silicate in Example 4 of the present invention; curve 11 indicates luminescent material $Zn_{1.992}SiO_4: Mn_{0.008}$. It can be seen from FIG. 2 that the luminous intensity of luminescent material prepared in Example 4 of the present invention exceeds that of fluorescent powder $Zn_{1.992}SiO_4: Mn_{0.008}$ without being doped with Ag by 50%. The luminescent material prepared in Example 4 of the present invention has advantages of good stability and high luminous efficiency.

Example 5

Preparation of Green Light-Emitting Material of a Blend of Metal Au Nanoparticles and $Zn_{1.9}SiO_4:Mn_{0.1}$ Weighing 1.0 g of silica aerogel, dissolving in 30 mL of ethanol solution containing $5.43\times10^{-3}$ mol/L $HAuCl_4$, stirring at 70° C. for 0.5 h, then sonicating for 10 min. Drying at 150° C., and grinding the dried samples well, pre-calcining at 1400° C. for 1 h. Then, weighing 0.6186 g of zinc oxide (ZnO), 0.0284 g of manganese oxide (MnO) and 0.2404 g of silica aerogel containing Au, mixing well. Calcining in the air at 1200° C. and keep the temperature constant for 4 h, then cooling down to room temperature, new green light-emitting material, which is the blend of metal Au nanoparticles and $Zn_{1.9}SiO_4:Mn_{0.1}$, is obtained. The molar ratio of Au to $Zn_{1.9}SiO_4:Mn_{0.1}$ is 0.01. The luminescent material with good luminescence property and color purity can emit green light under the excitation of cathode ray.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. Green luminescent materials of zinc silicate doped with manganese ions containing metal particles, wherein said green luminescent materials are a blend of metal M nanoparticles and $Zn_{2-x}SiO_4:Mn_x$; wherein M is one of Ag, Au and Pt, $0.001 \le x \le 0.1$, $0.00001 \le y \le 0.01$, y is the molar ratio of M to $Zn_{2-x}SiO_4:Mn_x$.

2. The green luminescent materials of zinc silicate doped with manganese ions containing metal particles as in claim 1, wherein x is in a range of $0.001 \le x \le 0.08$, y is in a range of $0.00001 \le y \le 0.005$.

3. Preparation method of green luminescent materials of zinc silicate doped with manganese ions containing metal particles, comprising:
    step 1: preparing silica aerogel containing metal particles;
    step 2: selecting source compound of zinc, source compound of manganese and silica aerogel containing metal particles obtained in step 1 according to stoichiometric ratios, mixing to form mixture, said stoichiometric ratios of the source compounds are according to the molar ratio of corresponding elements in a blend of metal M nanoparticles and $Zn_{2-x}SiO_4:Mn_x$, where M is one of Ag, Au and Pt, x is in a range of $0.001 \le x \le 0.1$, y is in a range of $0.00001 \le y \le 0.01$, y is the molar ratio of M to $Zn_{2-x}SiO_4: Mn_x$;
    step 3: sintering the mixture obtained in step 2 at constant temperature, cooling and grinding to obtain said green luminescent materials of zinc silicate doped with manganese ions containing metal particles.

4. The preparation method of green luminescent materials of zinc silicate doped with manganese ions containing metal particles as in claim 3, wherein said preparation of silica aerogel containing metal particles in said step 1 comprises: firstly, dissolving weighed silica aerogel in ethanol solution containing corresponding compound of metal, stirring at 50° C. to 75° C. for 0.5 to 3 hours, then sonicating for 10 min, drying at 60° C. to 150° C., grinding the dried raw materials, calcining at 600° C. to 1300° C. for 0.5 to 3 hours.

5. The preparation method of green luminescent materials of zinc silicate doped with manganese ions containing metal particles as in claim 3, wherein said corresponding compound of Ag is silver nitrate, said corresponding compound of Au is $HAuCl_4$, said corresponding compound of Pt is $HPtCl_4$.

6. The preparation method of green luminescent materials of zinc silicate doped with manganese ions containing metal particles as in claim 3, wherein in said step 2, said source compound of zinc is one of zinc oxide, zinc nitrate, zinc acetate and zinc oxalate; said source compound of manganese is one of manganese oxide, manganese acetate, manganese carbonate and manganese oxalate.

7. The preparation method of green luminescent materials of zinc silicate doped with manganese ions containing metal particles as in claim 3, wherein in said step 3, the sintering temperature is in the range of 1000° C. to 1400° C., the time of sintering is in the range of 1 to 10 hours.

8. The preparation method of green luminescent materials of zinc silicate doped with manganese ions containing metal particles as in claim 3, wherein in said step 3, the sintering is carried out at constant temperature in the air.

* * * * *